United States Patent [19]

Gellert

[11] Patent Number: 5,334,008
[45] Date of Patent: Aug. 2, 1994

[54] INJECTION MOLDING NOZZLE INSERT WITH VALVE MEMBER LOCATING BLADES

[76] Inventor: Jobst U. Gellert, 7A Prince Street, Georgetown, Ontario, Canada, L7G 2X1

[21] Appl. No.: 51,895

[22] Filed: Apr. 26, 1993

[51] Int. Cl.⁵ ............................................. B29C 45/23
[52] U.S. Cl. ................... 425/549; 264/328.9; 264/328.12; 425/564; 425/566
[58] Field of Search ............... 425/549, 562, 563, 564, 425/565, 566; 264/328.12, 328.9

[56] References Cited

U.S. PATENT DOCUMENTS 4,266,723  5/1981  Osuna-Diaz .......................... 425/549
4,303,382  12/1981  Gellert .................................. 425/566
5,022,846  6/1991  Schmidt ............................... 425/564

OTHER PUBLICATIONS

D-M-E brochure OVG2 entitled "D-M-E/OSCO Valve Gate Runnerless Molding Systems".

*Primary Examiner*—Tim Heitbrink
*Attorney, Agent, or Firm*—Dalesman & Company

[57] ABSTRACT

Injection molding apparatus for valve gating in which the valve member extends through a locating insert mounted at the front end of the nozzle. The locating insert has a pair of spiral blades extending inwardly from an outer collar. The spiral blades have curved inner edges which encircle the valve member sufficiently to maintain the valve member in accurate alignment with the gate as it reciprocates between the open and closed positions.

4 Claims, 2 Drawing Sheets

INJECTION MOLDING NOZZLE INSERT WITH VALVE MEMBER LOCATING BLADES

BACKGROUND OF THE INVENTION

This invention relates generally to injection molding and more particularly to valve gated apparatus having a locating insert mounted at the front end of each nozzle having an inwardly extending spiral blade or blades to accurately locate the reciprocating valve member in alignment with the gate.

Valve gated injection molding with actuating mechanism connected to the rear end of the valve member is well known. Often the valve member is located in alignment with the gate by the bore where it passes through the manifold and a sealing bushing near its rear end. An example of this is shown in U.S. Pat. No. 5,022,846 to Schmidt which issued Jun. 11, 1991. However, this has the disadvantage that the location of the reciprocating valve member is not always maintained sufficiently accurately, particularly if the gate is cylindrical.

It is also known to provide three inwardly extending locating pins or fins to guide the valve member near its front end. An example of this is shown at page 43 of D-M-E brochure OVG2 entitled "D-M-E/OSCO Valve Gate Runnerless Molding Systems". While this improves location of the valve member, the pins or straight fins have the disadvantage that flow lines can be produced in the product by the melt parting to flow past the locating pins or fins.

A nozzle tip having spiral channels extending around the valve member to impart a swirling motion to the melt entering the cavity is also known. This is seen in the applicants' U.S. Pat. No. 4,303,382 which issued Dec. 1, 1981.

SUMMARY OF THE INVENTION

Accordingly, it is an object of the present invention to at least partially overcome the disadvantages of the prior art by providing valve gated injection molding apparatus having a locating insert mounted at the front end of the nozzle having at least one inwardly extending spiral blade to accurately locate the reciprocating valve member in alignment with the gate.

To this end, in one of its aspects, the invention provides valve gated injection molding apparatus to convey melt to a gate extending through a mold to a cavity comprising a heated nozzle having an outer surface, a rear end, a front end, a melt bore extending longitudinally therethrough from the rear end to the front end, and a seat extending around the melt bore at the front end, the nozzle seated in a well having an inner surface in the mold with an insulative air space extending between the outer surface of the nozzle and the inner surface of the well in the mold, an elongated valve member having a cylindrical outer surface mounted to extend centrally in the melt bore through the nozzle, and valve member actuating means connected to the valve member whereby the valve member is reciprocated between an open position wherein melt flows through the gate from the melt bore into the cavity and a closed position wherein the gate is sealed off by the valve member, having the improvement comprising a valve member locating insert having an outer collar and at least one spiral blade extending a predetermined distance inwardly from the outer collar to a curved inner surface, the outer collar being received in the seat at the front end of the nozzle and the valve member extending centrally through the locating insert with the curved inner surface of the at least one spiral blade encircling the valve member sufficiently to locate and maintain the valve member in accurate alignment with the gate as the valve member reciprocates and melt flows around the valve member and through the locating insert past the at least one spiral blade.

Further objects and advantages of the invention will appear from the following description taken together with the accompanying drawings.

DETAILED DESCRIPTION OF THE INVENTION

Figure 1:
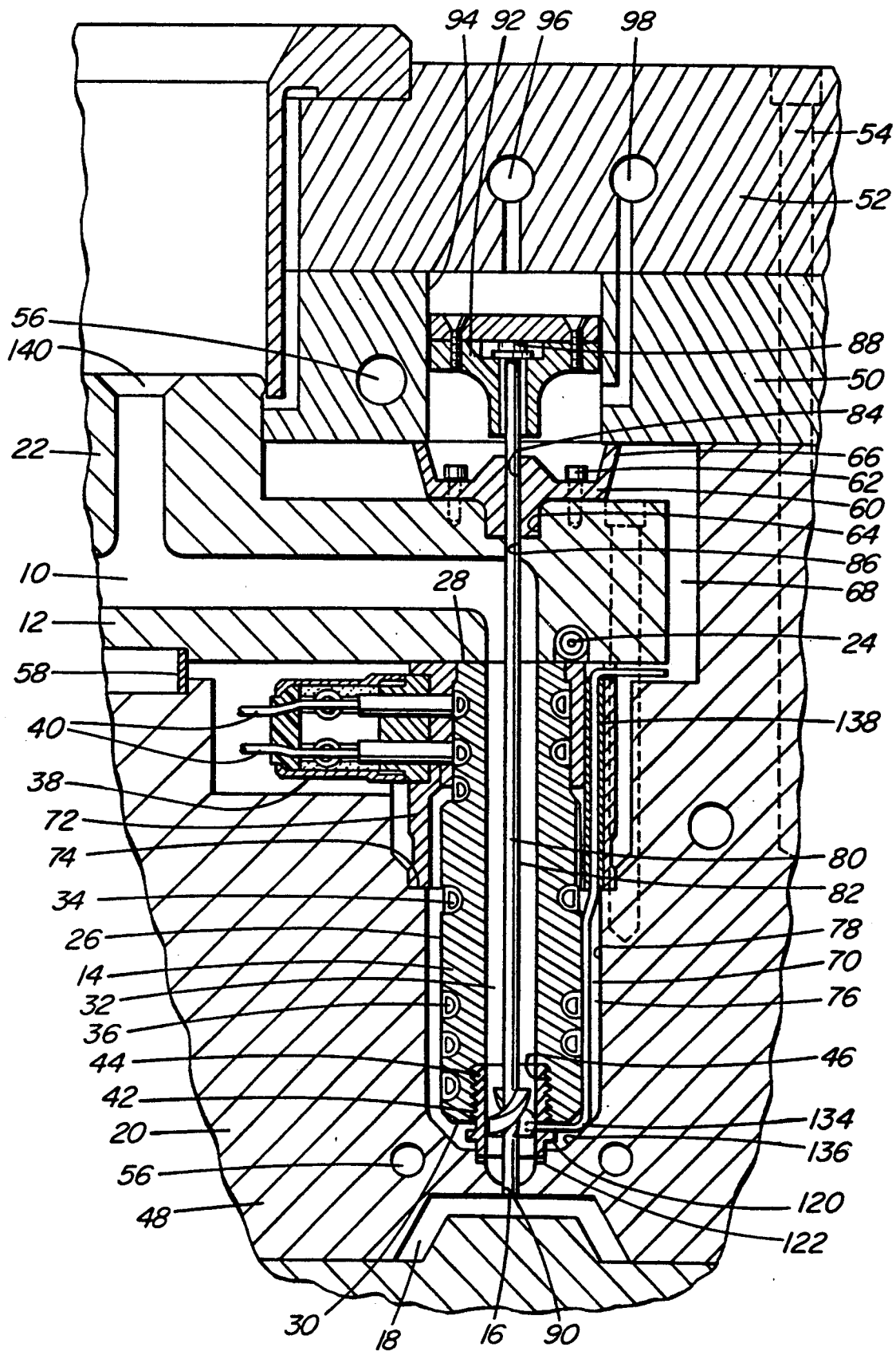
FIG. 1 is a sectional view of a portion of a multi-cavity valve gated injection molding system showing apparatus according to a preferred embodiment of the invention.

Reference is first made to FIG. 1 which shows a portion of a multi-cavity valve gated injection molding system having a melt passage 10 extending through a steel melt distribution manifold 12 and several steel nozzles 14 to convey pressurized plastic melt to respective gates 16 leading to different cavities 18 in the mold 20. The melt distribution manifold 12 has a cylindrical inlet portion 22 and is heated by an integral electrical heating element 24. Each nozzle 14 has an outer surface 26, a rear end 28, a front end 30, and a central melt bore 32 extending from the rear end 28 to the front end 30. The nozzle 14 is heated by an integral electrical heating element 34 which has a spiral portion 36 extending around the melt bore 32 and an external terminal 38 to which electrical leads 40 from a power source are connected. A valve member locating insert 42, as described in more detail below, is received in a seat 44 with a threaded inner surface 46 in the front end 30 of the nozzle 14.

In this particular configuration, the mold 20 includes a cavity plate 48, a cylinder plate 50, and a back plate 52 which are secured together by bolts 54. The mold 20 is cooled by pumping cooling water through cooling conduits 56 extending in the cavity plate 48 and cylinder plate 50. The distribution manifold 12 is mounted between the cavity plate 48 and the cylinder plate 50 by a central locating ring 58 and sealing bushings 60. Each sealing bushing 60 is secured by bolts 62 in a matching seat 64 in the manifold 12 and has a flanged portion 66 which bears against the cylinder plate 50. Thus, an insulative air space 68 is provided between the heated manifold 12 and the surrounding cooled cavity plate 48 and cylinder plate 50. The nozzle 14 is seated in a well 70 in the cavity plate 48 with a cylindrical locating flange 72 extending forwardly to a circular locating shoulder 74 in the well 70. Thus, an insulative air space 76 is similarly provided between the inner surface 78 of the well 70 and the outer surface 26 of the nozzle 14 to provide thermal separation between the heated nozzle 14 and the surrounding cooled mold 20.

An elongated valve member 80 with a cylindrical outer surface 82 extends through a bore 84 in the sealing bushing 60 and a bore 86 through the manifold 12 centrally into the melt passage 10 and the aligned melt bore 32 through the nozzle 14. The valve member 80 has an enlarged rear end 88 and a cylindrical tip 90 which is received in the gate 16 in the closed position while a valve member 80 having a tapered tip to be seated in a tapered gate can be used in other embodiments, accurate alignment is not as critical as when the tip 90 and gate 16 are cylindrical. The rear end 88 of the valve member 80 is connected to pneumatic actuating mechanism which includes a piston 92 seated in a cylinder 94 in the cylinder plate 50. Controlled air pressure is applied to opposite sides of the piston 92 through air ducts 96, 98 extending through the back plate 52 to reciprocate the valve member between a retracted open position and the forward closed position in which its cylindrical tip 90 fits in the gate 16. While a pneumatic actuating mechanism is shown for ease of illustration, of course hydraulic actuating mechanisms are used for many applications.

Figure 2:
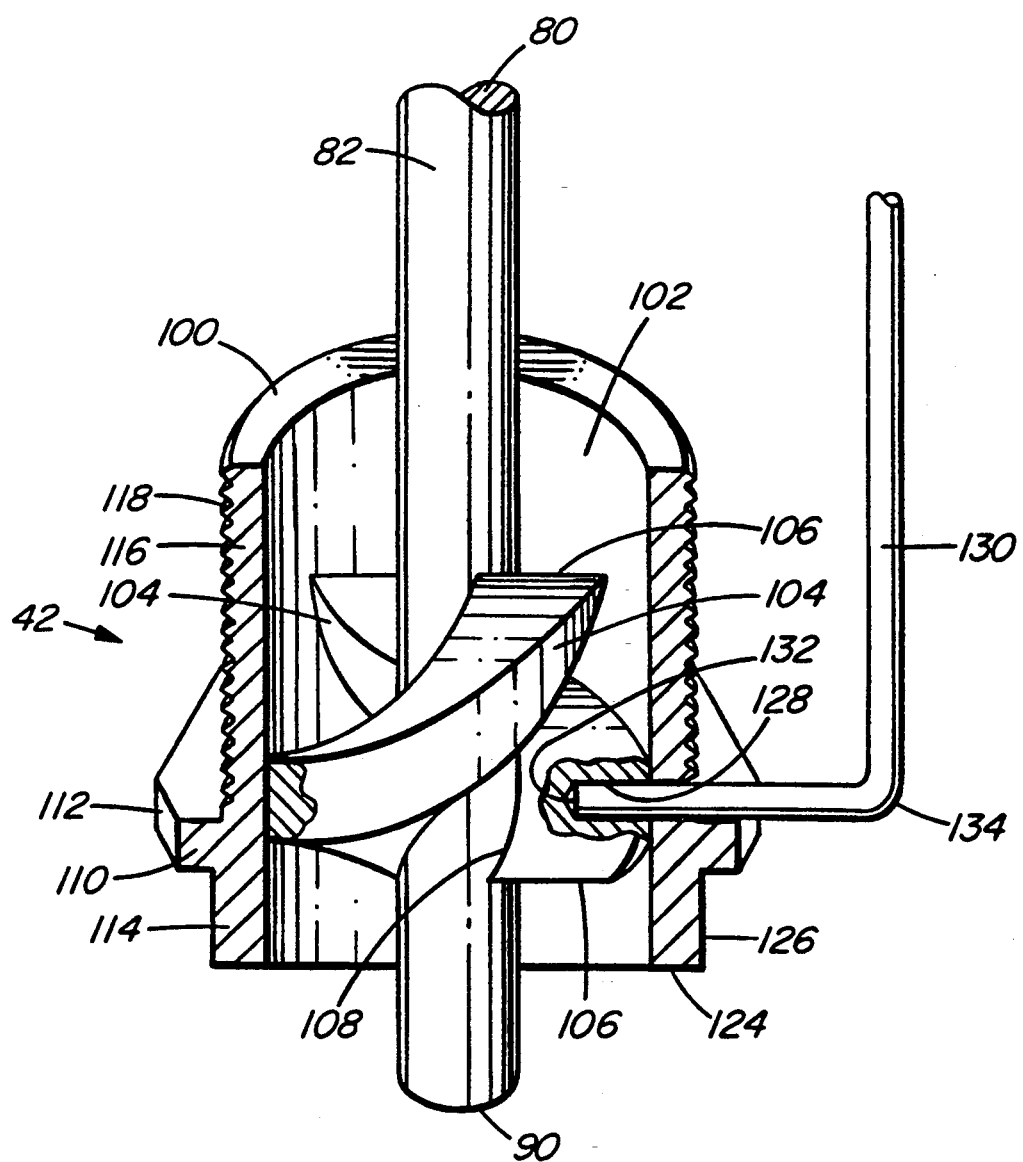
FIG. 2 is a cut away isometric view showing the valve member extending through the locating insert seen in FIG. 1.

Referring also to FIG. 2, the locating insert 42 has an outer collar 100 with a central opening 102 extending therethrough, and a pair of spiral blades 104 extending symmetrically inward a predetermined distance from the outer collar 100. Each spiral blade 104 tapers to sharp rear and front ends 106 and has a curved inner surface 108 which fits around the cylindrical outer surface 82 of the valve member 80. The outer collar 100 of the locating insert 42 has an intermediate portion 110 with a nut-like outer surface 112 extending between a cylindrical front portion 114 and a cylindrical rear portion 116 with a threaded outer surface 118. The rear portion 116 is screwed into the seat 44 at the front end 30 of the nozzle 14, and the nozzle 14 is received in the well 70 with the front portion 114 of the collar 100 seated in a seat or opening 120 in the mold 20. Screwing the locating insert 42 into the nozzle 14 has the advantage that it is secured in place with a small space 122 provided adjacent the front end 124 of the outer collar 100 to avoid damage to the mold 20 by heat expansion of the nozzle. Also, it is easily removed by applying a wrench to the hexagonal outer surface 112 of the intermediate portion 110 of the outer collar 100. Of course, the intermediate portion 110 can have a different shape to receive another suitable tool for removal. Thus, in this embodiment, the outer collar 100 of the locating insert 42 bridges the insulative air space 76 extending between the front end 30 of the nozzle 14 and the mold 20 and prevents pressurized melt escaping into the air space 76. A seal is provided between the outer surface 126 of the front portion 114 of the outer collar 100 and the surrounding seat 120.

In this position, the central opening 102 through the outer collar 100 of the locating insert 42 is aligned with the melt bore 32 through the nozzle 14. The elongated valve member 80 extends centrally through the locating insert 42 with the curved inner surfaces 108 of the fixed spiral blades 104 encircling the valve member 80 sufficiently to locate and maintain it in accurate alignment with the gate 16 as the valve member 80 reciprocates and the melt flows around the valve member 80, through the locating insert 42 between the spiral blades 104, and through the gate 16 in the open position. In addition to accurately locating the valve member 80 the spiral blades 104 impart a swirling motion to the melt. This swirling motion is accelerated as the melt approaches the small gate 16 and causes the melt to flow outward in the cavity 18 with a curving motion. This avoids flow lines in the molded product which can result if pins or straight blades are used to locate the valve member 80, and also provides a product which is stronger in the gate area. The locating insert 42 has a thermocouple bore 128 extending radially inward through the outer collar 100 into one of the spiral blades 104 to receive a thermocouple element 130 with a thermocouple at its inner end 132. As can be seen, the radial bore 128 is positioned to extend through the outer collar 100 of the locating insert 42 at or near the intermediate portion 110 so the thermocouple element 130 extends radially outward therefrom into the insulative air space 76 between the front end 30 of the nozzle 14 and the cavity plate 48. The thermocouple element 130 has a substantially 90 degree rearward bend 134 a predetermined distance from the inner end 132. When the nozzle 14 and locating insert 42 are sealed in place in the well 70, the bend 134 abuts against a tapered portion 136 of the inner surface 78 of the well 70 to securely retain the thermocouple element 130 in the radial bore 128. Precise location of the thermocouple element 130 fully in the radial bore 128 of the locating insert 42 is critical to accurately monitor and control the operating temperature during the thermodynamic cycle. In this configuration, the thermocouple element 130 extends rearwardly through the air space 76 and out through a hollow thermocouple tube 138. Thus, the thermocouple element 130 is easily removable, and in the event of leakage of melt into the air space 76, it will freeze off around the thermocouple element 130 in the thermocouple tube 138 to prevent leakage into the rest of the system.

In use, the injection molding system is assembled as shown in FIG. 1. While only a single cavity 18 has been shown for ease of illustration, it will be appreciated that the melt distribution manifold 12 normally has many more melt passage branches extending to numerous cavities 18 depending on the application. Electrical power is applied to the heating element 24 in the manifold 12 and to the heating elements 34 in the nozzles 14 to heat them to a predetermined operating temperature. Hot pressurized melt is then injected from a molding machine (not shown) into the melt passage 10 through the central inlet 140 according to a predetermined cycle in a conventional manner. The melt passage branches outward in the manifold 12 to each nozzle 14 where it extends through the central bore 32 and then through the aligned opening 102 in the locating insert 42 to the respective gate 16. In this embodiment, controlled pneumatic pressure is applied to the cylinders 94 through air ducts 96, 98 to control actuation of the pistons 92 and valve members 80 according to a predetermined cycle in a conventional manner. When the valve members 80 are in the retracted open position, the pressurized melt flows through the melt passage 10 and the gates 16 until the cavities 18 are full. When the cavities 18 are full, injection pressure is held momentarily to pack. The pneumatic pressure is then reversed to reciprocate the valve member 80 to the forward closed position in which the tip 90 of each of the valve members 80 is seated in one of the gates 16. The injection pressure is then released and, after a short cooling period, the mold is opened for ejection. After ejection, the mold is closed, pneumatic pressure is applied to retract the valve members 80 to the open position and melt injection pressure is reapplied to refill the cavities 18. This cycle is repeated continuously every few seconds with a frequency depending upon the number and size of the cavities and the type of material being molded. As mentioned above, the provision of the spiral blades 104 in each locating insert 42 to accurately locate the valve member 80 in alignment with the gate 16 imparts a swirling motion to the melt flowing through the locating insert 42. Also, the blades 104 being spiralled allows the curved inner edges 108 to sufficiently encircle the cylindrical outer surface 82 of the valve member 80. While a symmetrical pair of spiral blades 104 are shown, a single spiral blade or more than two spiral blades can be used in other embodiments.

While the description of the injection molding apparatus according to the invention has been given with respect to a preferred embodiment, it will be evident that various other modifications are possible without departing from the scope of the invention as understood by those skilled in the art and as defined in the following claims.

The embodiments of the invention in which an exclusive property or privilege is claimed is defined as follows:

1. In a valve gated injection molding apparatus to convey melt to a gate extending through a mold to a cavity comprising a heated nozzle having an outer surface, a rear end, a front end, a melt bore extending longitudinally therethrough from the rear end to the front end, and a seat extending around the melt bore at the front end, the nozzle seated in a well having an inner surface in the mold with an insulative air space extending between the outer surface of the nozzle and the inner surface of the well in the mold, an elongated valve member having a cylindrical outer surface mounted to extend centrally in the melt bore through the nozzle, and valve member actuating means connected to the valve member whereby the valve member is reciprocated between an open position wherein the melt flows through the gate from the melt bore into the cavity and a closed position wherein the gate is sealed off by the valve member, the improvement comprising;

a valve member locating insert having an outer collar and at least one spiral blade having a front and a rear end, the at least one spiral blade extending a predetermined distance inwardly from the outer collar to a curved inner surface, the outer collar being received in the seat at the front end of the nozzle and the valve member extending centrally through the locating insert with the curved inner surface of the at least one spiral blade encircling the value member sufficiently to locate and maintain the valve member in accurate alignment with the gate as the valve member reciprocates and melt flows around the valve member and through the locating insert past the at least one spiral blade the at least one spiral blade tapering to sharp edges at the front and rear ends.

2. Injection molding apparatus as claimed in claim 1 wherein the locating insert has a pair of spiral blades extending symmetrically inward from the collar to encircle the valve member.

3. Injection molding apparatus as claimed in claim 2 wherein the seat at the front end of the nozzle has a threaded inner surface, the outer collar of the locating insert has an intermediate portion extending between a threaded cylindrical rear portion and cylindrical front portion, the intermediate portion being engageable to removably screw the cylindrical rear portion of the outer collar into the seat at the front end of the nozzle, and the cylindrical front portion of the outer collar being received in a circular opening in the mold whereby the outer collar bridges the insulative space extending between the nozzle and the mold.

4. Injection molding apparatus as claimed in claim 3 wherein the engageable intermediate portion of the outer collar of the locating insert has an outer surface with a plurality of flat surfaces.

* * * * *